Dec. 14, 1937. W. W. DAVIDSON Re. 20,581

BLANK CONVEYING APPARATUS

Original Filed Nov. 21, 1928 4 Sheets-Sheet 1

INVENTOR.

BY William Ward Davidson

Geo. E. Walko,

ATTORNEY.

Dec. 14, 1937. W. W. DAVIDSON Re. 20,581
BLANK CONVEYING APPARATUS
Original Filed Nov. 21, 1928 4 Sheets-Sheet 2
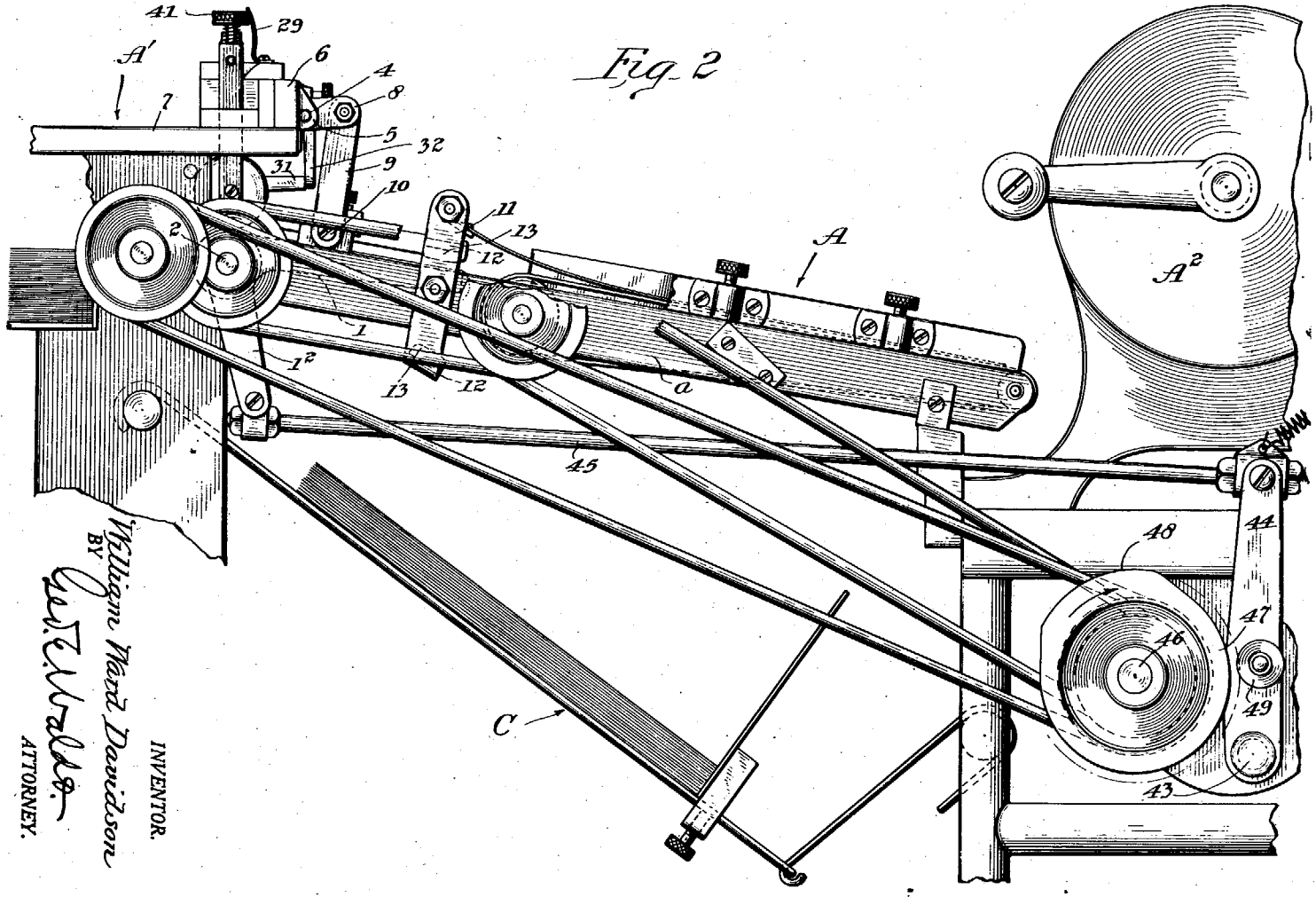
INVENTOR.
William Ward Davidson
BY
Geo. E. Waldo
ATTORNEY.

Dec. 14, 1937. W. W. DAVIDSON Re. 20,581
BLANK CONVEYING APPARATUS
Original Filed Nov. 21, 1928 4 Sheets-Sheet 3
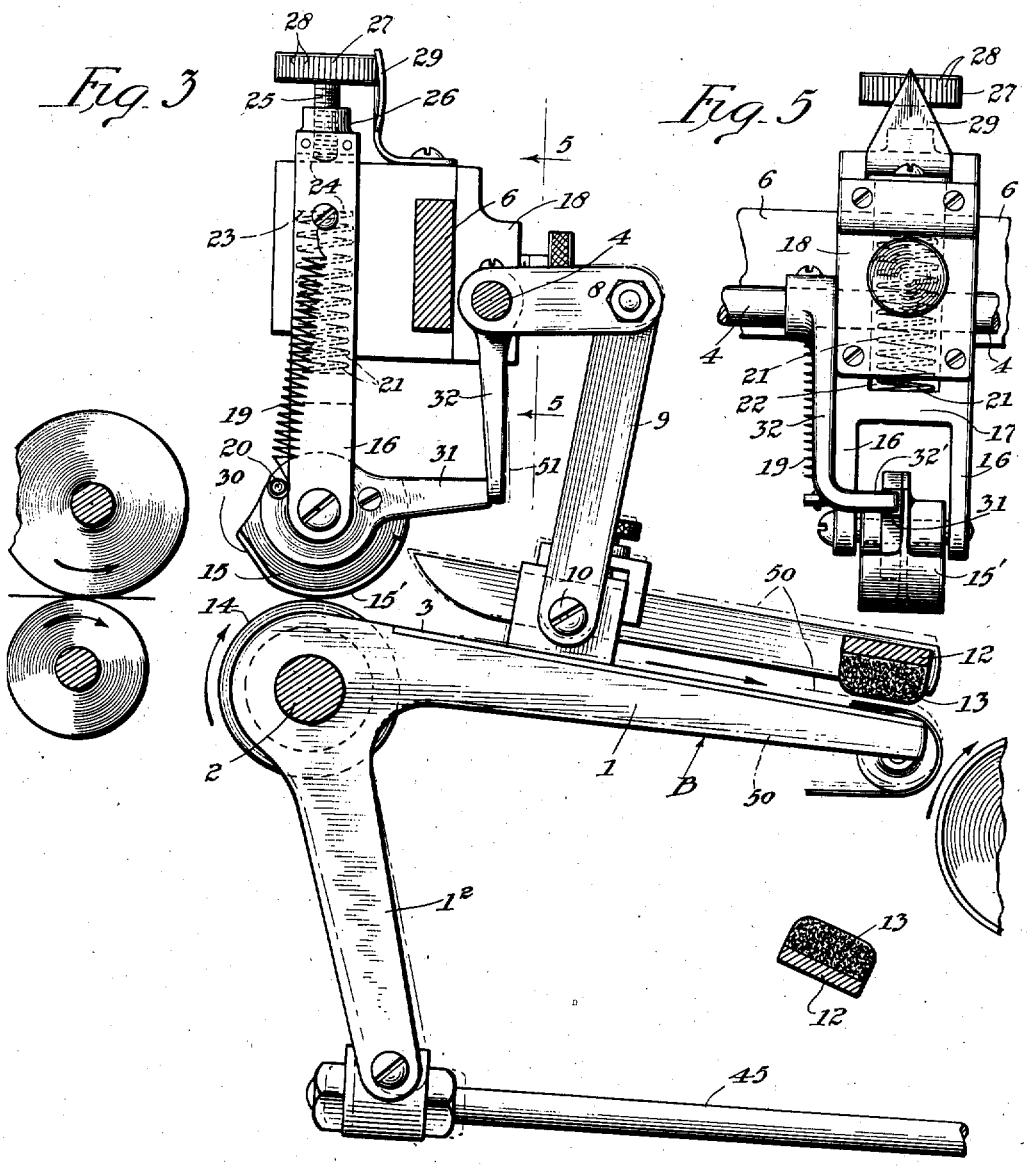
INVENTOR.
BY William Ward Davidson
Geo. E. Walsh
ATTORNEY.

Dec. 14, 1937. W. W. DAVIDSON Re. 20,581
BLANK CONVEYING APPARATUS
Original Filed Nov. 21, 1928 4 Sheets-Sheet 4
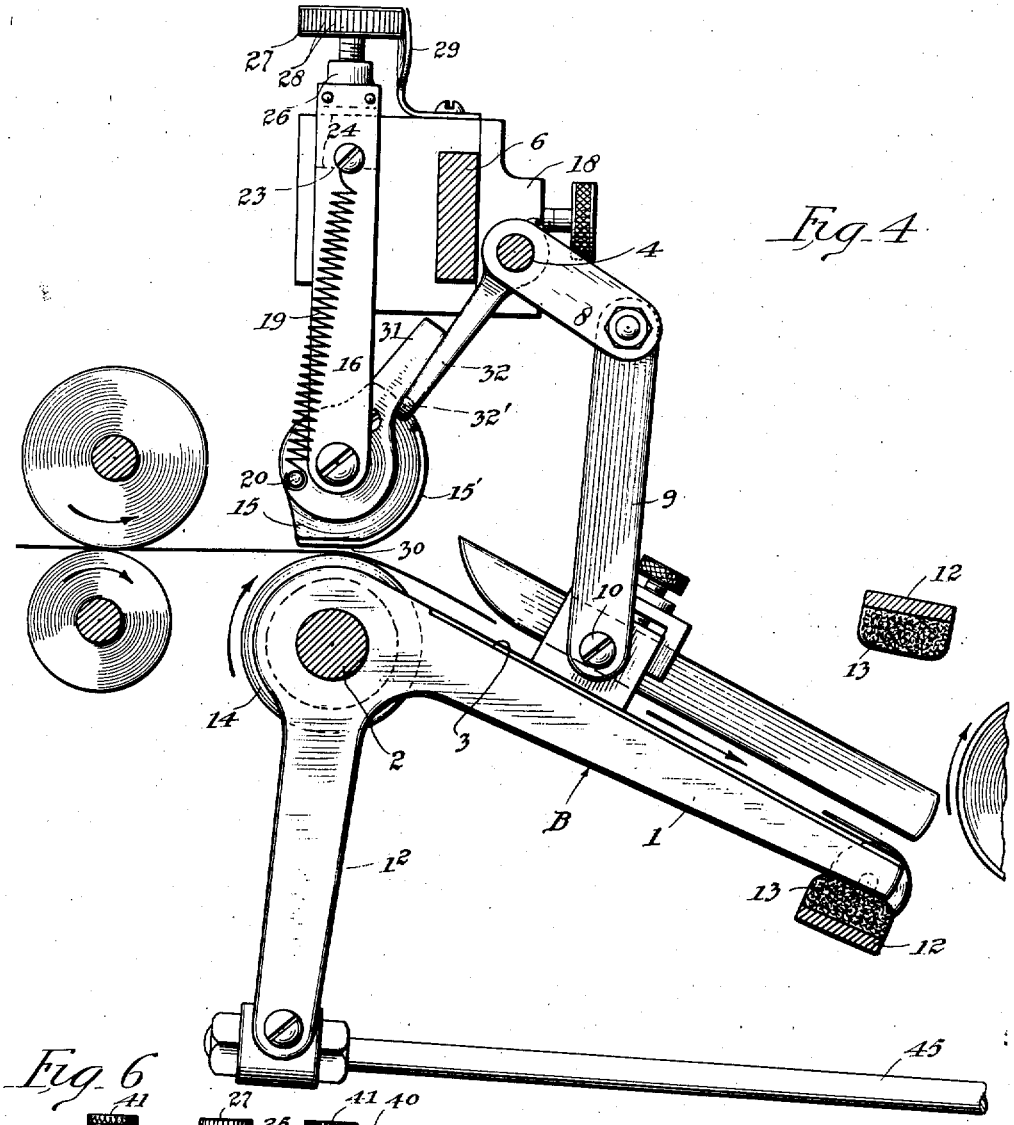
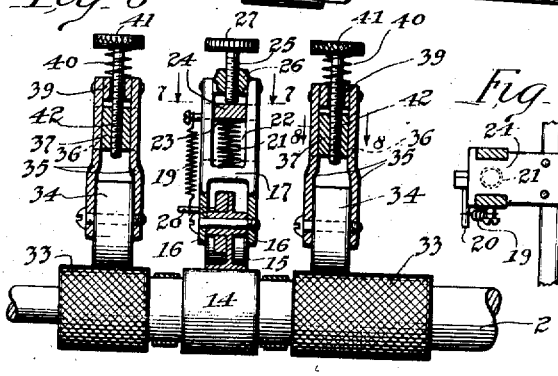
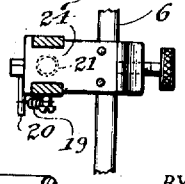
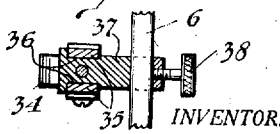
INVENTOR.
William Ward Davidson
BY Geo. E. Walker
ATTORNEY.

Reissued Dec. 14, 1937 Re. 20,581

UNITED STATES PATENT OFFICE 20,581

BLANK CONVEYING APPARATUS

William Ward Davidson, Evanston, Ill.

Original No. 1,930,510, dated October 17, 1933, Serial No. 320,856, November 21, 1928. Renewed February 13, 1933. Application for reissue October 16, 1935, Serial No. 45,300

39 Claims. (Cl. 209—88)

This invention relates to blank conveying apparatus.

Blank conveying apparatus of the general type to which my invention relates is particularly designed and adapted for delivering blanks—as sheets of paper, envelopes, cards, pamphlets, and the like—from a blank separating machine to the feed devices of another machine with which said blank separating machine is associated in operation.

The name "blanks" will be used throughout the specification and claims to designate, generally, all of the different articles which the apparatus is adapted to handle.

Practically all machines with which blank separating machines are used, are designed and adapted to operate upon single blanks, and, in most cases, the operation of such machines will be seriously impaired if a plurality of superposed blanks or "doubles" are delivered thereto. Also, as is generally well known to persons familiar with the operation of blank separating machines, "double" feeding occurs at times in the operation of practically all blank separating machines which operate at considerable speed, and particularly with what may be designated universal machines; that is, machines designed to operate on different kinds of stock.

The object of the present invention is to provide means in association with means for delivering blanks to a printing press or other machine, constructed and arranged for diverting or shunting any "doubles" which may occur from a normal path of feed, so that they will not be delivered to the machine with which said blank conveying apparatus is associated in operation, which will be simple in construction and practically infallible in operation.

To effect the objects of the invention, blank conveying apparatus embodying my invention and improvements comprises the various features, combinations of features and details of construction hereinafter described and claimed.

In the accompanying drawings, in which blank conveying apparatus embodying my invention and improvements is fully illustrated—

Fig. 2 is a side view thereof;

Fig. 3 is an enlarged sectional side view, substantially on the line 3—3 of Fig. 1, showing the parts in normal operating position, that is, in position to feed blanks from the blank separating machine to the machine in association with which it is used;

Fig. 4 is a view substantially similar to Fig. 3, showing the parts in position to divert or shunt "doubles" so that they will not be delivered to the machine with which the blank separating machine is used;

Fig. 5 is a fragmentary view substantially from the position 5—5 of Fig. 3;

Figure 1:
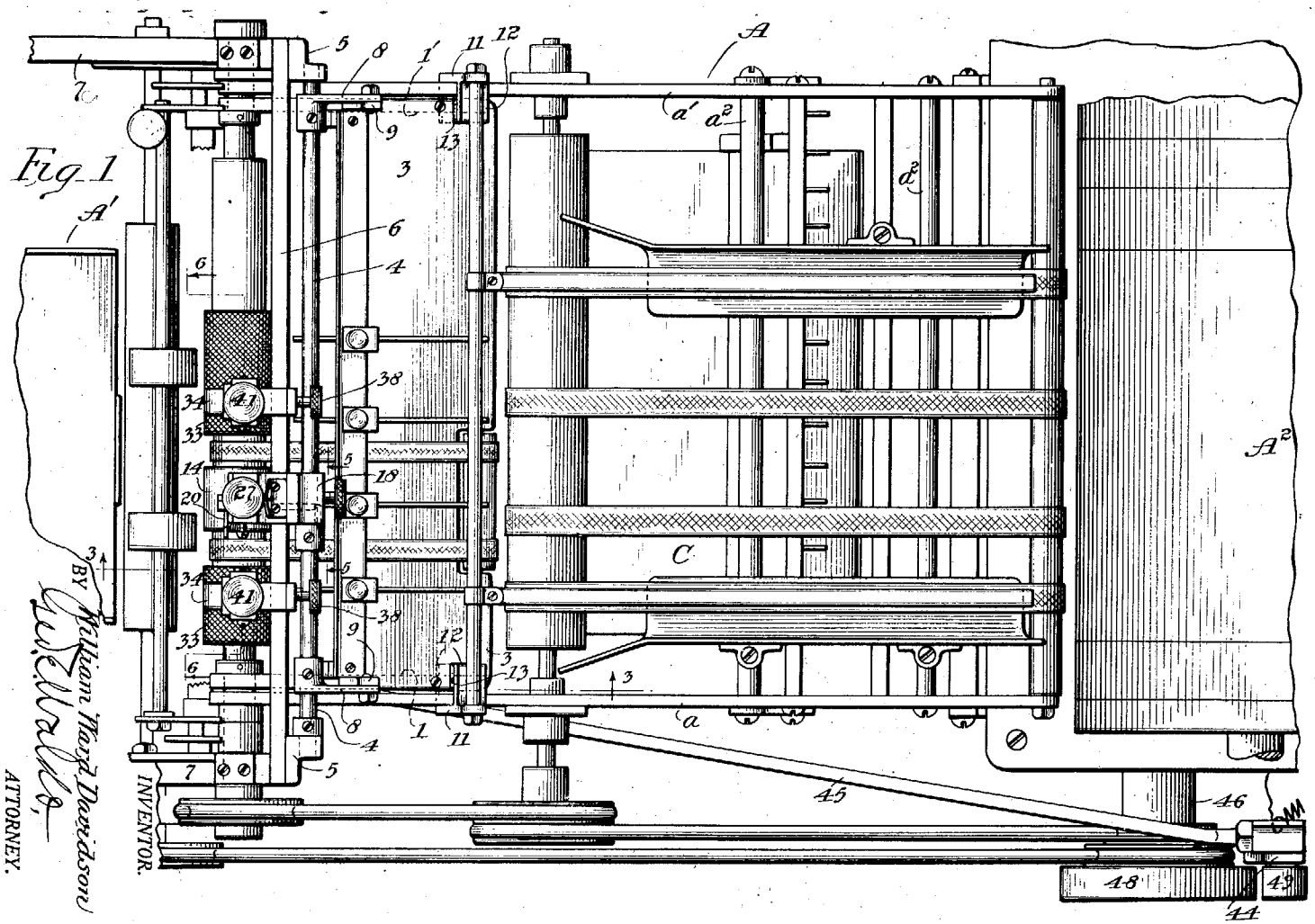
Fig. 1 is a top plan view of blank conveying apparatus embodying my invention and improvements, shown as applied for delivering blanks from a blank separating machine to a machine with which said blank separating machine is associated in use.

Fig. 6 is a fragmentary sectional view substantially on the line 6—6 of Fig. 1; and Figs. 7 and 8 are fragmentary sectional plan views substantially on the lines 7—7 and 8—8, respectively, of Fig. 6.

Describing the invention with particular reference to the drawings, in which, for purposes of clear and definite illustration, I have shown blank diverting or shunting means embodying my invention and improvements as incorporated in blank conveying apparatus, designated as a whole A, shown as applied in use for conveying separated blanks from a blank separating machine to the feeding devices of a printing press, parts of which, respectively, are indicated by the reference characters $A^1$, $A^2$.

As regards its usual features and except as hereinafter particularly described and pointed out, said blank separating apparatus may be of any usual or desired construction and will readily be understood by persons skilled in the art from an inspection of the drawings without a description thereof in detail.

In what I now consider to be its preferable embodiment, I attain the object of the invention as it relates to diverting or shunting "doubles", by means comprising a tilting diverting member, designated as a whole B, supported on a suitable frame consisting, as shown, of the side frame members $a$, $a'$ of the blank conveying apparatus A, and which are rigidly connected by transverse frame members $a^2$, see Fig. 1. In use, opposite ends of the side members $a$, $a'$ of the conveyor frame are secured to rigid parts of the frames of the blank separating machine A' and of the printing press $A^2$, respectively.

As shown, the tilting diverting member B comprises a frame consisting of side frame members 1, 1' pivoted at one end to a shaft 2 mounted to rotate in bearings in the side members $a$, $a'$, said members 1, 1' being positioned inside of said frame members $a$, $a'$.

Depending from the member 1 is an arm $1^2$, said member 1 and arm $1^2$ forming a bell-crank lever, and, as shown, a plate 3 is secured to the upper sides of said pivoted members 1, 1' and rigidly connects the same.

The frame members 1, 1' of the tilting diverting member B are operatively connected to a rock shaft 4 fitted to turn freely in bearings formed in brackets or projections 5 on a bar 6 which extends transversely of the conveyor and is positioned above and in spaced relation to the pivoted arms 1, 1'. As shown, opposite ends of the bar 6 are supported by bars 7 secured to the side frame members of the blank separating machine A' but, within the scope and contemplation of my invention, may be supported in any desired manner, as by upright standards secured to the side frame members *a*, *a'* of the conveyor A, thus rendering said conveyor, including the tilting diverting member B, self-contained. Secured to the rock shaft 4 adjacent to opposite sides of the conveyor are lever arms 8, which are connected by links 9 to studs 10 on the side frame members 1, 1' of the tilting diverting member B at a distance from their pivoted ends, the relation being such that the pivoted members 1, 1' forming the frame of said tilting diverting member will extend parallel with each other.

Pivotal movement of the tilting diverting member B is limited by means of suitable stops consisting, as shown, of a bar 11 secured to the side member *a* of the main frame of the conveyor, rigid parts of which extend inwardly, as shown at 12, so that they will project into the path of movement of the frame member 1 as it turns pivotally. As shown, also, rubber cushions 13 are secured to the adjacent sides of the inwardly projecting parts 12 with which said member 1 will contact directly, thus preventing, in large measure, shock and noise incident to such contact in operation.

In accordance with my invention, the tilting diverting member B is adapted to be maintained normally in position corresponding to a contemplated normal path of movement of separated blanks from the blank separating machine A' to the printing press or other machine $A^2$, shown in full lines in Fig. 3, and is adapted to be released to permit it to turn by gravity into position to divert or shunt separated blanks from their designed normal line of feed, if and when "doubles" occur and to deliver said "doubles" elsewhere than to the printing press or other machine $A^2$, as shown in Fig. 4, by means as follows:

Rotatably mounted at the receiving end of the tilting conveyor section B, so that blanks delivered thereto from the blank separating machine A' will pass between the same, are caliper members 14 and 15. The lower caliper member consists of a cylindrical roller and, as shown, is secured to the shaft 2 to which said tilting diverting member B is pivoted, as heretofore described, and to which, in operation, rotation is imparted, as shown in the drawings, Figs. 1 and 2. The upper caliper member 15 is rotatably mounted to oscillate and so as to be bodily adjustable toward and from the lower caliper member 14 and comprises a surface 15' which forms the segment of a cylinder which, under normal operating conditions, is opposed to the cylindrical surface of the lower caliper member 14.

In the preferable construction shown, said caliper member 15 is oscillatably mounted at the lower ends of forked arms 16 which form parts of a slide member 17 fitted to suitable guide bearings formed on a head or carriage 18 secured to the bar 6, see particularly Fig. 7, thus rendering said caliper member 15 vertically adjustable towards and from the lower caliper member 14.

Under normal operating conditions, the caliper member 15 is passive and is maintained normally in a position of rest by means of a spring 19 which connects a pin 20 secured in said caliper member, eccentric to its axis of rotation, with a rigid part of or projection on the slide 17, the position of rest of said passive caliper member being defined by contact of the pin 20 with an arm 16 on the slide member 17, or other suitable stop.

The caliper member 15 is maintained yieldingly at the limit of its advancement toward the lower caliper member 14 by a spring 21, Figs. 1 and 6, positioned in a slot 22 formed in the slide member 17, and which reacts between the lower end of said slot and the under side of a projection 24 on the carriage 18, Figs. 6 and 7, which extends into the slot 22 in the slide member 17. Said spring will operate in an obvious manner to maintain the slide member 17 and caliper member 15 normally at the limit of their advancement toward the caliper member 14, and said slide member and caliper member are adapted to be retracted from the caliper member 14 against the force of the spring 21 by a screw 25 which has threaded engagement with a hole formed in a nut 26 which forms part of the slide member 17, said nut being positioned at the upper end of the slot 22 therein, the lower end of said screw bearing against the top side of the projection 24 on the carriage 18, all as clearly shown in Fig. 6 of the drawings. The screw 25 has a knurled head 27 for turning the same, formed on which are graduations 28 which in practice are referred to an index finger 29 secured to the carriage 18, said graduations and index finger providing means for effecting very fine and accurate adjustment of the caliper member 15 with reference to the caliper member 14.

In practice, the caliper member 15 is adjusted in such relation to the caliper member 14 that they will be separated by a space which will permit of a single blank, of the kind upon which the conveyor is operating at a given time, to pass freely through the same, but the width of which will be less than the thickness of two superposed blanks.

As shown also, the surface of the caliper member 15 opposed to the surface of the caliper member 14 is relieved or cut away, as shown at 30, at the side thereof that blanks will be fed between said caliper members in the operation of the conveyor, the relation being such that when the caliper member 15 is in its position of rest the relieved surface 30 thereof will be substantially in the position shown in Fig. 3 of the drawings and such, also, that when said caliper member 15 is turned in a counterclockwise direction, said relieved surface 30 will be brought into a position opposite to the surface of the lower caliper member 14, as shown in Fig. 4, thus providing a space between the caliper members of sufficient width to permit two or more blanks to pass freely between said caliper members.

In accordance with my invention, the tilting diverting member B is supported in inoperative or non-diverting position, corresponding to a desired normal path as shown in Fig. 3, and is adapted to be released so as to permit it to fall by gravity into position to divert conveyed blanks from the normal path and to deliver them at a point of discharge other than the feeding devices of the printing press $A^2$, by means, in part, as follows:— Secured to the caliper member 15 is a stop arm 31 which, as shown, extends substantially radially to the axis of rotation of said caliper member, and secured to the rock shaft 4 is a lever arm 32, a rigid part of which is adapted to contact with the end of said stop arm 31 when said caliper member 15 is in its position of rest, defined by contact of the pin 20 secured therein with an arm 16, the relation being such that when the lever arm 32 is in contact with the stop arm 31, the tilting diverting member B will be in position corresponding to the desired normal path of movement of the conveyed blanks, shown in Fig. 3.

For reasons presently apparent, the stop arm 31 and the lever arm 32 are offset relative to each other, as shown in Fig. 5, the end 32' of the lever arm 32 being bent substantially at right angles so that its extreme end will align with the stop arm 31.

Mounted in association with the caliper members 14 and 15 are blank conveying devices, said blank conveying devices being in duplicate at opposite sides of said caliper members and preferably positioned closely adjacent thereto. As said conveying devices are in duplicate, one description will suffice for both, and the following description will, therefore, be in the singular:—

Each of said conveying devices, see particularly Fig. 6, comprises a cylindrical member 33 on the shaft 2 and a roller 34 rotatably mounted in the lower ends of arms 35 which are slidably mounted in guide grooves 36 formed in a head 37 secured to the bar 6, preferably in such manner as to be adjustable lengthwise of said bar members and toward and from the caliper member 15. As shown, the head 37 is provided with a slot which slidably engages the bar 6, as clearly shown in Fig. 8, and said head is adapted to be secured in different adjusted positions on said bar by means of a thumb screw 38 which has threaded engagement with a hole formed in a part of said head, the inner end of which abuts against the bar 6.

The upper ends of the slide bars 35 are rigidly connected to a head or block 39, and the feed roller 34 is adapted to be maintained in contact with the lower feed roller 33 with a yielding pressure by means of a spring 40 inserted between the head 41 of a screw 42 having threaded engagement with the head 37, said screw 42 passing freely through a hole formed in the head 39.

To afford greater traction, the roller 33 secured to the shaft 2 is knurled, but obviously may be plain, if desired.

In operation, the feed rollers 33 and 34 will operate in an obvious manner to exert a pull on the fed blanks as they pass between the caliper members 14 and 15, the force exerted thereby being sufficient to turn the caliper member 15 pivotally against the force of the spring 19 applied thereto when "double" feeding occurs; and said caliper member is free to respond to such force, that is, when a plurality of superposed blanks are delivered to said caliper members 14 and 15. Rotation of said caliper member 15 will continue until the relieved portion 30 thereof is brought opposite the surface of the lower caliper member 14, thus providing a space of increased width for the passage of said superposed blanks. If, however, the aggregate thickness of said superposed blanks is greater than the normal clearance between the surface of the lower caliper member 14 and the relieved surface 30 of the caliper member 15, they will raise the caliper member 15 against the force of the spring 21 and will thus produce a frictional resistance or drag to the movement of such superposed blanks, which, however, will be overcome by the pull of the associated conveying rollers 33 and 34, thus preventing such superposed blanks from becoming jammed between the caliper members, which would prevent further operation of the conveyor.

As hereinbefore described, the lower caliper member 14 comprises a roller carried by the shaft 2 upon which the lower conveying rollers 33 are mounted and these rollers are of substantially the same diameter, thus placing said lower caliper member and the lower conveying rollers 33 in alignment transversely of the machine and in position to contact the forward edges of fed blanks simultaneously.

It should be understood that by the use of the term "forward edges of the blanks" is meant the edges which are first presented to the feed roller and caliper means in other words "forward edges" refers to the direction of travel of the blanks.

Furthermore, as clearly shown in the drawings, the upper caliper member 15, which has a cylindrical surface 15' opposed to the lower caliper member, is arranged substantially vertically above the lower caliper member 14 and the upper conveying rolls 34 are substantially directly above the lower conveying rollers 33 and consequently when blanks of excess thickness, such as doubles are delivered to the conveyor, the forward edges thereof will engage the conveying rollers 33 and 34 substantially simultaneously with the engagement thereof with the caliper, the arrangement being such that the excess thickness blanks will preferably engage the conveying rollers slightly before it engages the caliper members.

Such engagement of the blanks, with the caliper and the associated conveying rollers, is especially desirable when thin flexible blanks such as thin paper are being conveyed, to prevent possible wrinkling of the blanks and the consequent clogging of the feeder.

With the described construction and arrangement of parts, it is obvious that when a plurality of superposed blanks is fed between the caliper members 14 and 15, rotation in a counter-clockwise direction will be imparted to the caliper member 14, which will move the end of the stop arm 31 thereon out of line with and above the lateral projection 32' at the end of the lever arm 32 on the shaft 4, whereupon the tilting diverting member B will fall by gravity from its position corresponding to a normal path, shown in Fig. 3, to the position shown in Fig. 4, in which the frame member 1 of said tilting conveyor section will rest in contact with the stop 12 on the bar 11, and said superposed blanks will be delivered below the normal path and into a suitable receptacle, indicated as a whole C in Fig. 2.

Movement of the tilting diverting member B from normal position into the position shown in Fig. 4, through its connection with the rock shaft 4 heretofore described, will operate to turn said rock shaft to move the lever arm 32 secured thereto, from its position shown in Fig. 3, defined by contact of said lever arm with the stop arm 31 on the caliper member 15, to the position thereof shown in Fig. 4. Also, due to the fact that the stop arm 31 on the caliper member 15 has been turned into a position above the laterally projecting end 32' of the lever arm 32, rotation of said lever arm from its position shown in Fig. 3 to that shown in Fig. 4 will cause the laterally projecting end 32' of said lever arm to engage the under side of the stop arm 31 and to turn it positively into the position shown in Fig. 4. As shown, also, the relation is such that when the stop arm 31 is in the position shown in Fig. 4, the relieved surface 30 on the caliper member 15 will be substantially parallel to the normal line of feed of the conveyed blanks, which will provide the maximum clearance between said relieved surface and the surface of the lower caliper member 14, which in most cases will permit superposed blanks to pass freely between said caliper members and will relieve the conveyed blanks from all drag due to frictional contact thereof with said surface 30 and will correspondingly relieve the duty imposed upon the feed rollers 33 and 34, except where the aggregate thickness of said superposed blanks is greater than the normal maximum clearance between said relieved surface and the lower caliper member.

In accordance with my invention, also, my improved apparatus comprises means, operable at each feeding cycle, for moving the blank diverting member to non-diverting position, shown in Figs. 2 and 3, and for supporting said diverting member in such non-diverting position, said means being arranged for retracting the rock arm 32 from engagement with the stop arm 31 on the caliper member 15, the relation being such that said caliper member will be thus disengaged from the blank diverting member when the advancing edges of blanks delivered to the conveyor enter between the caliper members 14 and 15, with the caliper member 15 in its position of rest, thus permitting said caliper member 15 to respond to a force—specifically, the traction or friction produced by the entering of superposed blanks between said caliper members—tending to turn it in a counter-clockwise direction to bring the stop arm 31 out of engaging relation to the rock arm 32, whereby, when said diverting member is released by said independent supporting means, it will assume diverting position.

In the preferable construction shown, the means for thus moving said diverting member to non-diverting position and for disengaging the caliper member 15 therefrom is as follows:—Pivoted at 43 to a rigid support, which conveniently, may be part of the frame of the printing press $A^2$, is a lever arm 44, the upper end of which is connected by means of a rod 45 with the lower end of the arm $1^2$ which depends from the pivoted side frame member 1 of the tilting diverting member B, and secured to a shaft 46 which we will assume is the main driving shaft of the printing press $A^2$ to which my improved apparatus is shown as applied in use, is a cam 47, which comprises a raised portion 48 which, at each revolution of said cam, is arranged to engage a roller stud 49 secured to the lever 44, said cam being so proportioned that, through the described connections of the lever 44 with the tilting diverting member B said cam will operate to turn said tilting diverting member from its depressed position shown in Fig. 4 to a position slightly above its position corresponding to a normal path of the conveyed blanks, its extreme position being indicated by the dotted lines 50 in Fig. 3 of the drawings, such extreme position being defined by the upper stop 12 on the bar 11.

Due to the fact that the position of the tilting diverting member B, corresponding to a normal path of movement of the main blanks, is defined by contact of the lever arm 32 on the rock shaft 4 with the end of the stop arm 31 on the caliper member 15, it is obvious that movement of the tilting diverting member B above its normal raised position will retract the lever arm 32 on the rock shaft 4 from contact with the end of the stop arm 31, to the position shown substantially by the line 51, at each revolution of the shaft 46 and cam 47, thus relieving said stop arm 31 from the pressure due to the weight of the tilting conveyor section B and leaving the caliper member 15 free to rotate under the influence of superposed blanks delivered thereto, except for the resistance of the spring 19 applied thereto.

In practical operation, the cam 48 will be timed with the printing press $A^2$ and also with the blank separating machine A'.

As shown in Figs. 1 and 2, the tilting diverting member B is counterbalanced by a spring, illustrated in Figs. 1 and 2 as applied to the lever arm 44, the end of which remote from said arm is connected to a fixed part of the frame of the machine $A^2$. Said spring will be calibrated to sustain a considerable part of the weight of said diverting member B, thus reducing the duty on the cam 47 and correspondingly reducing the power necessary to return said diverting member from diverting to non-diverting position.

From the foregoing description of its construction and operation, it is apparent that the effective factor controlling the operation of my improved diverting apparatus, is the thickness of blanks delivered to the means for tripping or releasing the diverting means, a blank not exceeding a predetermined thickness, traversing said releasing or tripping device without affecting the same, while superposed blanks, which may be considered as exemplifying blanks exceeding such predetermined thickness, when delivered to the releasing or tripping mechanism, will release or trip the diverting device and will render the same operative. Accordingly, I have used the designation "blanks exceeding a predetermined thickness" to include both superposed blanks and single blanks of excess thickness.

I claim:

1. In combination, blank conveying means, a movably supported member for diverting blanks exceeding a predetermined thickness from a contemplated path, a caliper for detecting blanks of excess thickness comprising a movable member, and means for supporting said diverting member in non-diverting position comprising means in association with said movable caliper member, and means separate from said movable caliper member, operable during the calipering operation and arranged to disengage said movable caliper member and said diverting member, thereby freeing said movable caliper member.

2. In combination, blank conveying means, a movably supported member for diverting blanks exceeding a predetermined thickness from a contemplated path, a caliper for detecting blanks of excess thickness comprising a movable member, means for supporting said diverting member in non-diverting position comprising means in association with said movable caliper member, and means operable at each cycle for moving said blank diverting member from diverting to non-diverting position and arranged to disengage said movable caliper member and said diverting member during the calipering operation, thereby freeing said movable caliper member.

3. In combination, blank conveying means, a movably supported member for diverting blanks exceeding a predetermined thickness from a contemplated path, a caliper for detecting blanks of excess thickness comprising a movable member, means for supporting said diverting member in non-diverting position comprising means in association with said movable caliper member, and means operable at each cycle for disengaging the diverting member from the supporting means therefor associated with said caliper during the calipering operation.

4. In combination, blank conveying means, a movably supported member for diverting blanks exceeding a predetermined thickness from a contemplated path, a caliper for detecting blanks of excess thickness comprising a movable member, means for supporting said diverting member in non-diverting position comprising means in association with said movable caliper member, and means separate from said movable caliper member operable at each cycle, arranged to disengage said diverting member from the supporting means therefor associated with said caliper member, during the calipering operation.

5. The combination specified in claim 1, which comprises opposed caliper members, one of which is rotatable and the other oscillatory and normally passive, means for maintaining said passive caliper member yieldingly in position of rest, and supporting means associated with said caliper comprising a stop on said normally passive member, and means associated with said blank directing member arranged to engage said stop when said passive caliper member is in its position of rest.

6. The combination specified in claim 1, which comprises caliper members, one of which is rotatable and the other of which is oscillatory and normally passive, means for maintaining said passive caliper member yieldingly in a position of rest, comprising a spring applied thereto and a stop which limits turning movement of said caliper member by said spring.

7. The combination specified in claim 1, which comprises opposed caliper members one of which is rotatable and the other of which is oscillatory and normally passive, and means for maintaining said normally passive member yieldingly in position of rest, comprising a spring applied thereto, and a stop which limits turning movement of said caliper member by said spring, the relation being such that when free, said passive caliper member may turn with a blank passing between said caliper members.

8. The combination specified in claim 1, which comprises opposed caliper members one of which is rotatable and the other of which is oscillatory and normally passive, and said oscillatory member having a portion of its surface relieved to provide increased clearance between said caliper members when said relieved portion is brought into opposition to the surface of the other caliper member by turning movement of said passive caliper member from its position of rest.

9. The combination as specified in claim 1, which comprises blank conveying means associated with the caliper.

10. The combination as specified in claim 1, which comprises driven blank conveying rolls positioned at both sides of the caliper.

11. The combination as specified in claim 1, which comprises driven blank conveying rolls positioned at both sides of the caliper and closely adjacent thereto.

12. The combination specified in claim 1, the diverting member of which is pivotally supported.

13. The combination specified in claim 1, the blank diverting member of which is pivotally supported and which comprises stops which limit turning movement of said diverting member in both directions.

14. The combination specified in claim 1, the blank diverting member of which is pivoted at its receiving end.

15. The combination specified in claim 1, the blank diverting member of which comprises pivoted supporting arms one of which is a bell-crank-lever, and the means for supporting and operating said diverting member comprises a rock shaft, a lever arm thereon arranged to co-operate with a stop arm carried by a caliper member to support said diverting member in non-diverting position, and means separate from said caliper comprising a driven cam, a pivoted lever, a projection thereon positioned in the path of said cam, and a connecting rod which connects said cam actuated lever with an arm of said bell-crank-lever.

16. In combination, blank conveying means, a movably supported member for diverting blanks exceeding a predetermined thickness from a contemplated path, a caliper for detecting blanks of excess thickness comprising a movable member, means for supporting said diverting member in non-diverting position comprising means in association with a movable caliper member, and means separate from said movable caliper member operable at each feeding cycle, arranged to move said diverting member from diverting to non-diverting position and to disengage said diverting member from the supporting means therefor associated with said caliper member during the calipering operation.

17. In conveying apparatus for sheets of paper, constituting blanks, the combination of calipering means comprising a rotatable member, and a movable member having a blank contacting surface opposed to the rotatable member, said members being spaced apart sufficiently to permit the undetected entrance and passage there-between of blanks of a predetermined thickness, blank gripping and advancing rolls associated with the calipering means and adapted to convey blanks through and discharge them from the calipering means, the construction being such that the blank contacting surface of the caliper means is disposed substantially in the transverse plane of the gripping and advancing rolls but not rearwardly thereof so that the rolls grip the forward edges of the blanks substantially at the instant but not later than when said forward edges of the blanks reach the calipering members, and means for diverting blanks exceeding the predetermined thickness from a predetermined normal line of feed of single blanks.

18. The combination as specified in claim 17, in which a space is provided, forward of said calipering means, over which space a blank exceeding a predetermined thickness may be conveyed, said space being sufficient to allow the means for moving the diverting member from non-diverting to diverting position to become effective.

19. The combination specified in claim 17, in which one caliper member is oscillatory and may be adjusted toward and away from the opposed caliper member.

20. The combination specified in claim 17, in which one caliper member is oscillatory and adjustable toward and away from said opposed member and which said oscillatory member is adapted to be secured in an adjusted position against movement in the direction of the opposed member and yieldingly in the opposite direction.

21. The combination as specified in claim 17, in which one caliper member is oscillatory and adapted to maintain a fixed position during the advancement of blanks of a predetermined thickness between the said caliper members.

22. The combination specified in claim 17, in which the blank gripping and advancing means include a driven roll mounted on a shaft, and one of said caliper members comprises a roll which is carried on said shaft.

23. The combination specified in claim 17, in which the blank gripping and advancing means comprise a driven roll mounted on a shaft, and one of said caliper members comprises a roll which is mounted on said shaft and rotatable therewith.

24. The combination specified in claim 17, in which the blank gripping and advancing means comprise, two rolls co-acting with a driven roll to grip a blank, and means for adjusting the said co-acting rolls in an axial direction in regard to each other.

25. The combination specified in claim 17, in which the blank gripping and advancing means comprise two rolls co-acting with a driven roll to grip and advance a blank, and one of the said caliper members being oscillatory and disposed between the said co-acting rolls.

26. The combination specified in claim 17, in which the blank gripping and advancing means comprise two rolls co-acting with a driven roll to grip and advance a blank, one of the said caliper members being oscillatory and disposed between the said co-acting rolls, and means for varying the distance between the said caliper member and each of the said co-acting rolls in an axial direction in reference to the said driven roll.

27. In combination, a blank conveying apparatus in which blanks are conveyed along a contemplated path, a driven roll and a roll co-acting therewith to grip a blank and convey it, caliper means for detecting a blank of more than predetermined thickness, said caliper means comprising members having opposed calipering surfaces, one of which members is oscillatory and is normally passive, means for normally maintaining said oscillatory member yieldingly in position of rest, and said oscillatory member having a portion of its surface relieved to provide increased clearance between said caliper members when said relieved portion is brought into opposition to the opposed surface of the other caliper member by turning movement of said oscillatory caliper member from its position of rest, the arrangement being such that the axes of the driven roll and the roll co-acting therewith and the axis of the oscillatory caliper member are in a substantially common plane, the said plane being substantially at right angles to the plane of a blank passing between the said driven and co-acting roll, and including means for diverting a blank of more than predetermined thickness from the normal contemplated path, and said diverting means controlled by said oscillatory caliper member.

28. The combination specified in claim 27, in which the caliper member which is opposed to the oscillatory member is rotatable.

29. The combination specified in claim 27, in which the caliper member opposed to the oscillatory caliper member comprises a driven roll.

30. In blank conveying means of the class described, the combination of blank diverting means including a member designed to divert a blank of more than a predetermined thickness from a normal path, caliper means for detecting blanks of more than predetermined thickness comprising opposed members spaced apart sufficiently to permit the undetected passage there-between of blanks of a predetermined thickness one of which is oscillatory, said members being so disposed that a blank may be passed there-between, said oscillatory member being adjustable into a position wherein the passage of a blank of more than a predetermined thickness will cause it to oscillate, means associated with said blank diverting member and adapted to be controlled by the oscillatory caliper member, the arrangement being such that the oscillatory caliper member is free from contactual relationship with the said associated means or with the said diverting member during the oscillatory movement of said caliper member caused by the passage between said caliper members of a blank exceeding a predetermined thickness.

31. The combination specified in claim 30, and which includes a driven roll and a roll co-acting therewith to grip a blank when presented thereto and convey it, the arrangement being such that the axes of the said driven roll and the said co-acting roll and the axis of the oscillatory caliper member are substantially in a common plane, and that a blank exceeding a predetermined thickness, when presented to said gripping rolls engages the said rolls substantially at the instant that but not later than when said blank is initially engaged by the said caliper members.

32. The combination specified in claim 30, and which includes a driven roll and a roll co-acting therewith to grip and advance a blank when presented thereto, the arrangement being such that the axes of the said driven roll and the said co-acting roll and the axis of the oscillatory caliper member are substantially in a common plane which plane is disposed substantially at right angle to the plane of a blank when passing between the opposed caliper members, and that a blank of more than a predetermined thickness when presented to said gripping rolls engages said rolls substantially at the instant that but not later than when the blank initially engages said caliper members.

33. In blank conveying apparatus, the combination of calipering means for detecting blanks of more than predetermined thickness, comprising opposed calipering members spaced apart sufficiently to permit the undetected entrance and passage there-between of blanks of a predetermined thickness, blank gripping and advancing means associated with the calipering means and arranged to convey blanks through and discharge them from between the calipering members, the arrangement being such that said blank gripping means grips the blank substantially at its forward edge, substantially at the instant but not later than when said forward edge of the blank reaches the calipering position, the effective grip thereof being continuous during the calipering operation, and the advancement of blanks between the calipering members thereby being continuous and uninterrupted, and means controlled by said calipering means for diverting blanks, exceeding the contemplated thickness, from a predetermined normal line of feed of single blanks.

34. In blank conveying apparatus, the combination of calipering means for detecting blanks of more than predetermined thickness comprising spaced apart opposed members between which blanks of a predetermined thickness can pass without detection, opposed blank gripping and advancing members by which the blanks are conveyed between said calipering members, the arrangement being such that the gripping and advancing members grip the blanks substantially at their forward edges, substantially at the instant but not later than when the said forward edges of the blanks reach the calipering position, the effective grip of said advancing members being continuous during calipering operation, and the advancement of blanks between the calipering members being continuous and uninterrupted, and means controlled by said calipering members for diverting blanks exceeding a predetermined thickness from a contemplated line of feed.

35. The invention as defined in claim 17, in which the diverting means includes a diverting member, means for moving the diverting member from a non-diverting position to a diverting position, which means becomes operative as a blank exceeding a predetermined thickness is gripped by the blank gripping and advancing means.

36. In blank conveying means of the class described, the combination of blank diverting means including a member designed to divert a blank of more than a predetermined thickness from a normal path, opposed blank calipering members normally spaced apart only sufficiently to permit the undetected passage therebetween of blanks of predetermined thickness, one of which caliper members is arranged and adapted to be oscillated by the passage of a blank of more than the predetermined thickness, feed rolls adapted to engage the blanks substantially at the instant that, but not later than, a blank of greater than predetermined thickness engages the oscillatory caliper member, means controlled by said oscillatory caliper member for retaining the diverting member in non-diverting position, and means for releasing the said retaining means from the control of said oscillatory member as a blank is fed to the calipering means, whereby the oscillatory member is free to be moved by the passage of a blank of more than the predetermined thickness.

37. The combination specified in claim 17 in which the blank gripping and advancing means comprises a driven roll and a roll coacting therewith, said rolls being disposed substantially parallel to the axis of the movable caliper member.

38. A blank conveying mechanism capable of handling blanks of relatively flexible material such as paper sheets and the like in which the blanks are conveyed along a contemplated path and including conveyor rolls, one of which is driven, caliper means for detecting blanks of more than a predetermined thickness, said means being associated with said conveyor rolls and comprising opposed means spaced apart to permit the undetected passage of blanks of predetermined thickness, the arrangement being such that upon the feeding to said rolls of blanks of more than said predetermined thickness, they will engage the conveyor rolls substantially at the instant that, but not later than, the said blanks initially engage the caliper means whereby the relatively flexible blanks are in tension when engaged by the caliper means, and hence will not jam, and means controlled by the caliper means for diverting blanks of more than predetermined thickness from the normal contemplated path.

39. In conveying apparatus for sheets of paper, constituting blanks, the combination of calipering means comprising a rotatable member, and a movable member having a blank contacting surface opposed to the rotatable member, said members being spaced apart sufficiently to permit the undetected entrance and passage therebetween of blanks of a predetermined thickness, blank gripping and advancing rolls associated with the calipering means and adapted to convey blanks through and discharge them from the calipering means, the construction being such that the blank contacting surface of the caliper means is disposed substantially in the transverse plane of the gripping and advancing rolls but not rearwardly thereof so that the rolls grip the forward edges of the blanks substantially at the instant but not later than when said forward edges of the blanks reach the calipering members, means for diverting blanks exceeding the predetermined thickness from a predetermined normal line of feed of single blanks, and means for automatically resetting the diverting means so that the sheet conveying operation continues after the diverting means has been actuated.

WILLIAM WARD DAVIDSON.